May 25, 1954

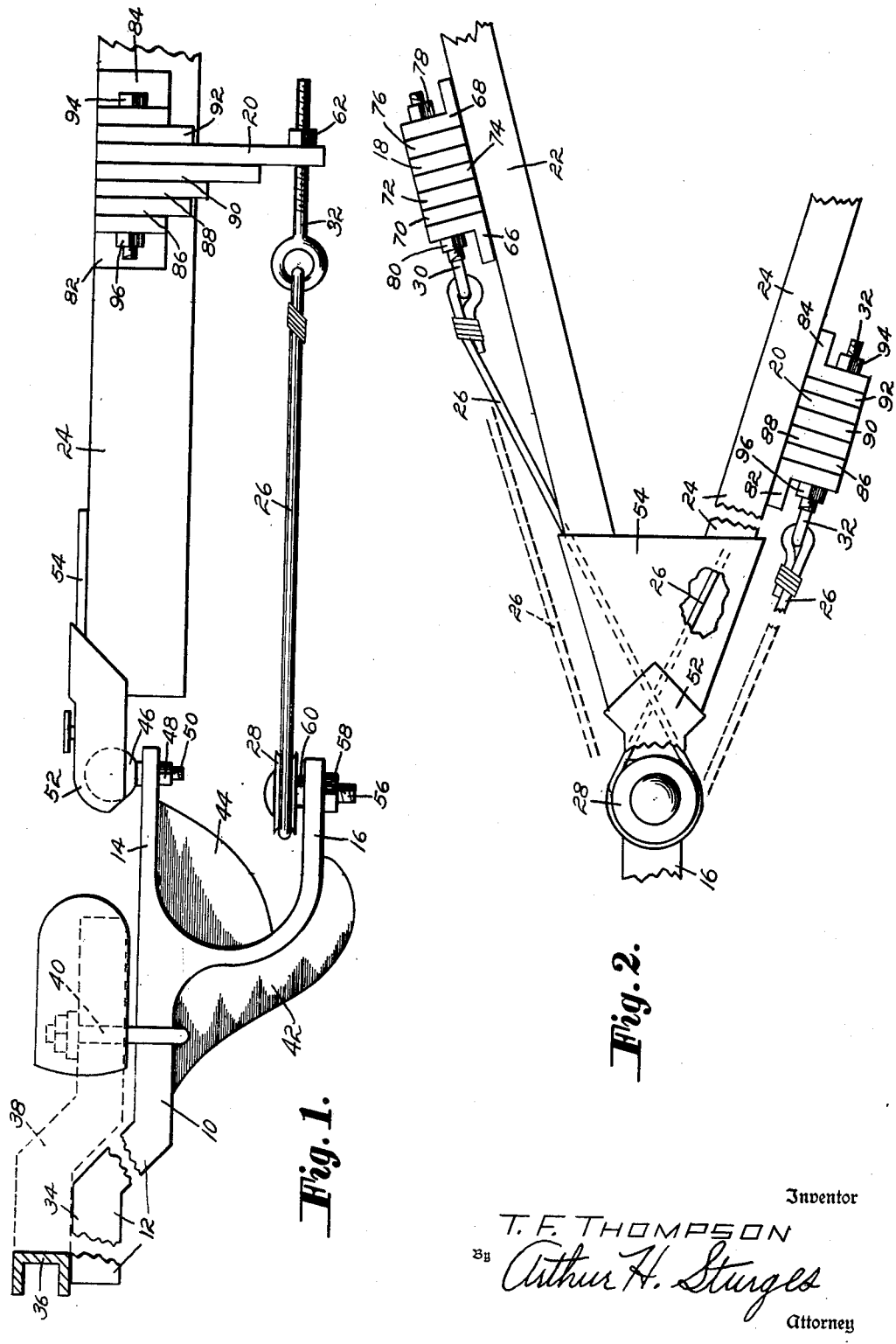

T. F. THOMPSON 2,679,404

TRAILER HITCH

Filed May 1, 1951

Inventor
T. F. THOMPSON
By Arthur H. Sturges
Attorney

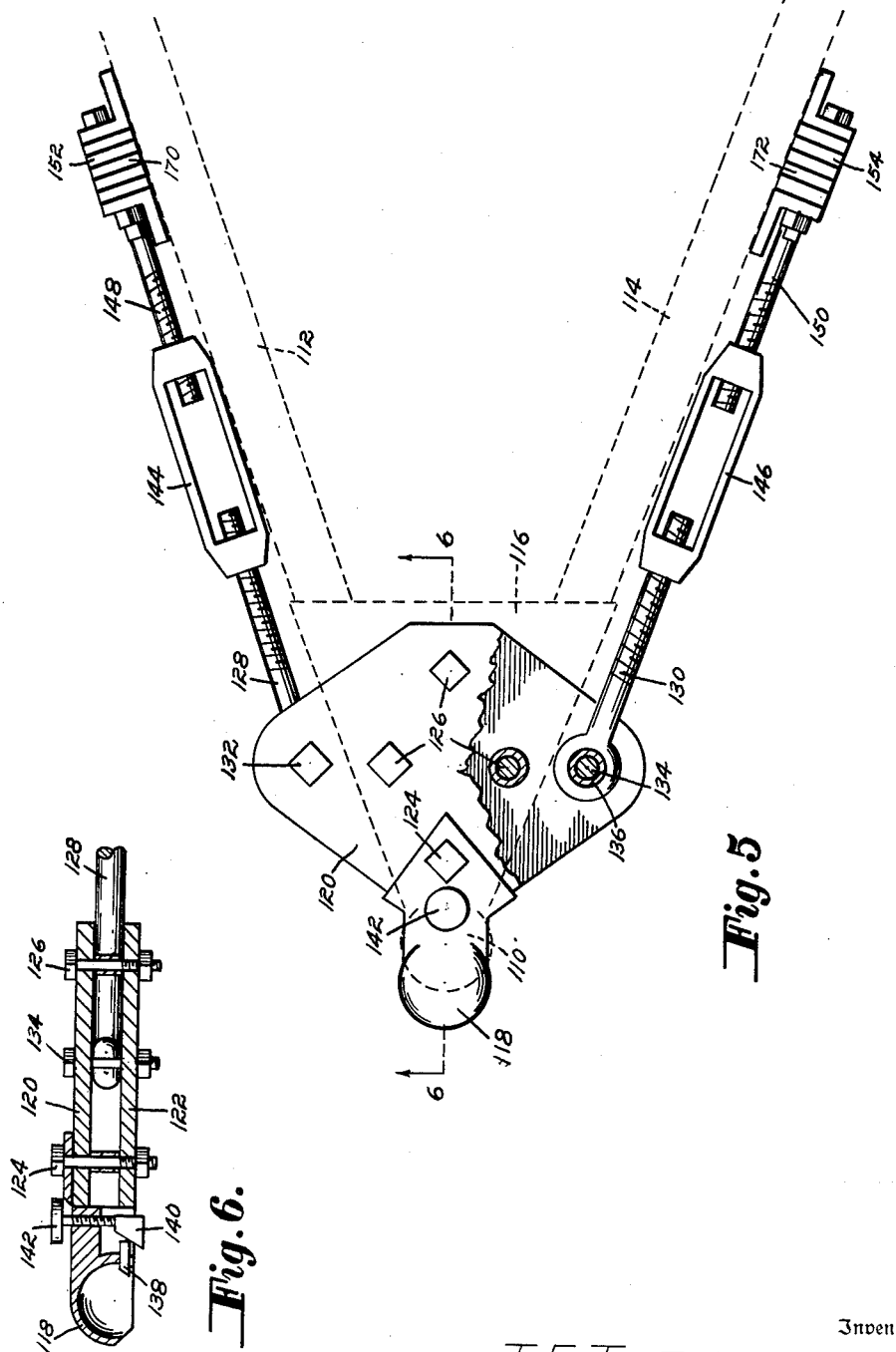

Patented May 25, 1954

2,679,404

UNITED STATES PATENT OFFICE 2,679,404

TRAILER HITCH

Theodore F. Thompson, Des Moines, Iowa, assignor of one-half to H. W. Hartupee, Des Moines, Iowa Application May 1, 1951, Serial No. 224,007

2 Claims. (Cl. 280—461)

This invention relates to a trailer hitch of the type used primarily for attaching house trailers to motor vehicles of the pleasure type, and in particular a stabilizing element positioned in a plane spaced below the conventional ball and socket hitch and including means for connecting depending spring members on side rails of a house trailer to a lower arm of a bracket carried by a towing vehicle and on which the ball of the said conventional ball and socket hitch is positioned.

The purpose of this invention is to provide means for attaching trailers and particularly house trailers to towing vehicles whereby overloading springs and excessive wear in bearings and other parts of the towing vehicle resulting from shocks and jars caused by uneven road surfaces are reduced to a minimum.

With the conventional type of hitch the draw bar load or downward pressure at the forward end of the trailer, which often amounts to from 330 to 700 pounds, carries the rear end of the towing vehicle downward thereby overloading the springs, and at the same time causing the forward end to tilt upwardly. With the forward end of the vehicle inclined upwardly the headlights are directed upwardly instead of downwardly upon the road, and upwardly directed headlights not only cause objectionable glare rays, but also make driving difficult.

With these and other thoughts in mind this invention contemplates an improved type of hitch in which lateral thrusts and vertical loads resulting from traveling around corners and curves and up and down grades are counteracted by a second hitch element spaced below the conventional hitch and connected to the sides of side rails of a trailer and to the towing vehicle at a point positioned ahead of the ball and socket connection of the conventional hitch.

The object of this invention is, therefore, to provide means for constructing a hitch for coupling a house trailer to a towing vehicle whereby rigid elements are replaced by devices that provide sufficient yielding to permit lateral and vertical movements in traveling around curves and up and down grades over highways without resulting shocks and jars to the towing vehicle.

Another object of the invention is to provide means in a hitch for urging the parts back to normal positions after lateral and vertical bending resulting from the vehicles traveling around curves and up and down grades.

A further object of the invention is to provide means for incorporating stabilizing elements in a hitch in addition to the conventional coupling elements wherein the resultant forces of the stabilizing elements are applied in a plane parallel to the plane in which the conventional hitch is positioned.

A still further object of the invention is to provide stabilizing means for reducing side sway and vertical bending of couplings between house trailers and towing vehicles to a minimum which may be used in combination with conventional trailer hitches.

And a still further object of the invention is to provide an improved trailer hitch which is of a simple and economical construction.

With these and other objects and advantages in view the invention includes a horizontally disposed U-shape mounting bracket having an extension for attaching the bracket to parts of a towing vehicle, a ball positioned on an upper arm thereof for receiving a socket carried by side rails of a trailer, and means connecting spring elements on the said side rails of the trailer to a lower arm of the bracket.

Other features and advantages of the invention will appear from the following description taken in connection with the drawings, wherein:

Figure 1 is a side elevational view of the improved trailer hitch showing the hitch connecting side rails of a trailer to parts of a towing vehicle, with parts of the vehicle shown in dotted lines.

Figure 2 is a plan view of the hitch with parts broken away and with one side rail of a trailer contracted for the purpose of illustration.

Figure 5 is a plan view of the hitch shown in Figure 3 being taken on line 5—5 of Figure 3.

Figure 6 is a vertical section through the socket connection of the hitch shown in Figure 3, being taken on line 6—6 of Figure 5.

Figures 3, 4:
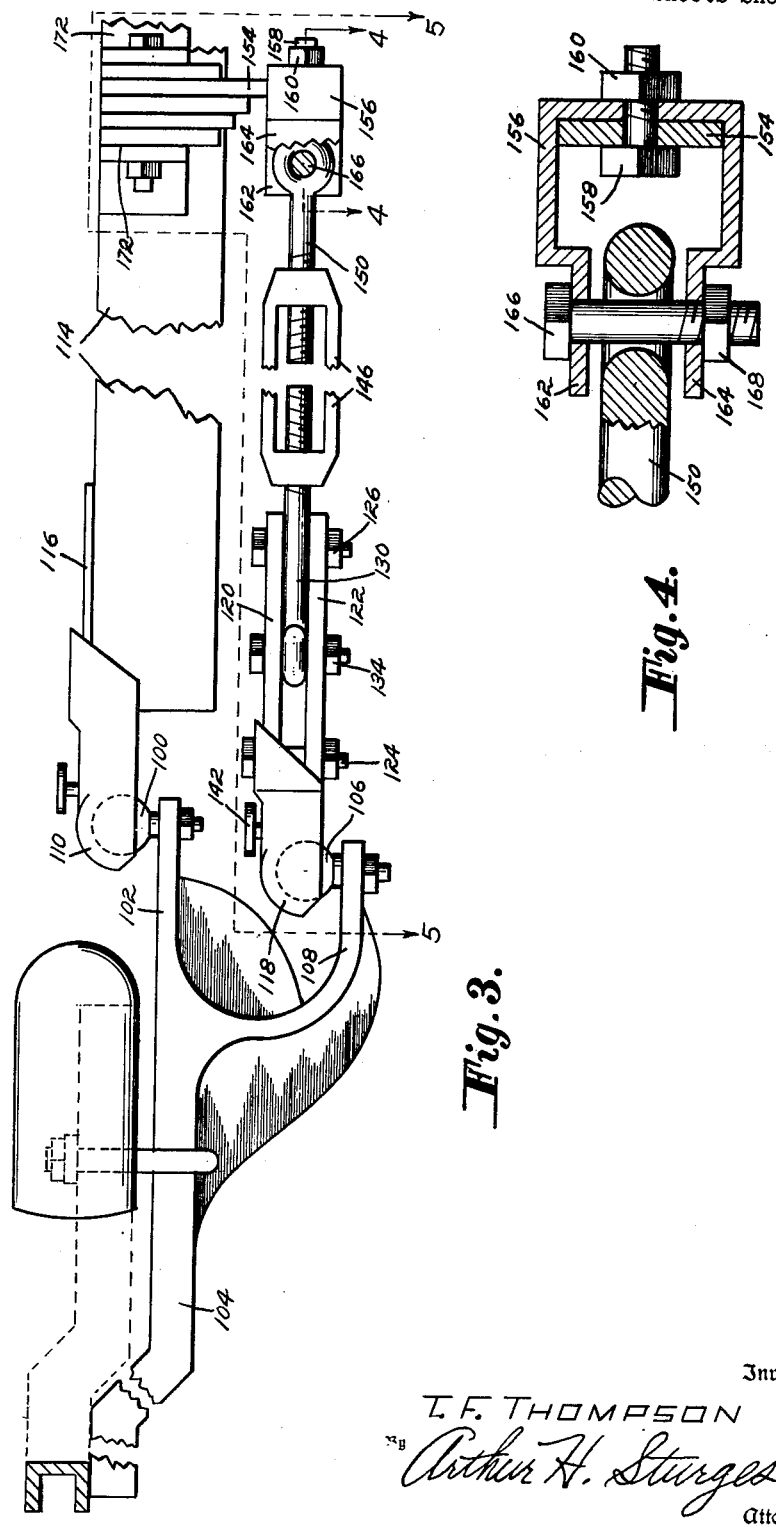
Figure 3 is a side elevational view similar to that shown in Figure 1, illustrating a modification wherein cables are replaced with links and turnbuckles and a second ball and socket connection is used on the lower arm of the mounting bracket.
Figure 4 is a cross section through the hitch shown in Figure 3, being taken on line 4—4 of Figure 3.

Referring now to the drawings wherein like reference characters denote corresponding parts the improved trailer hitch of this invention includes a bracket 10 having an extension 12, an upper arm 14 and a lower arm 16, spring plates 18 and 20 on side rails 22 and 24 of a trailer, and a cable 26 which is trained around a sheave 28 on the lower arm 16 of the mounting bracket and connected to the lower ends of the spring plates by screw eyes 30 and 32.

An upwardly offset end 34 of the extension 12 of the bracket 10 is secured, preferably by welding, to a cross member 36 of a towing vehicle and the intermediate part of the bracket is secured to a frame member 38, shown in dotted lines, of the vehicle by a U-bolt 40. The bracket is provided with reinforcing webs 42 and 44 and a ball 46 of a conventional type of hitch is secured on the upper surface of the upper arm 14 by a nut 48 that is threaded on a stud 50 extended from the ball. A socket 52 which is mounted on the side rails 22 and 24 of the trailer by a plate 54 is positioned over the ball 46, thereby forming the conventional type of hitch.

In addition to the above-noted conventional hitch elements the improved trailer hitch of this invention is provided with a stabilizing element that includes the cable 26 which extends around the sheave 28 and the cable is positioned with the ends thereof connected to the screw eyes or eye bolts 30 and 32 in the lower ends of the spring plates 18 and 20, respectively. These elements provide a coacting hitch structure that has a tendency to draw the parts back into normal positions after lateral or vertical bending caused by traveling up and down grades or around curves or corners.

The sheave 28 is journaled on a stud 56 in the lower arm 16 of the bracket 10 and the stud is secured in the arm by a nut 58. A spacing washer 60 is provided on the stud between the sheave and arm 16.

The screw eyes 30 and 32 are adjustably held in the spring plates 18 and 20 by nuts 62, and the spring plates are secured to the side rails 22 and 24 by brackets positioned on the sides of the rails. The plate 18 on the rail 22 is secured in a bracket formed with clip angles 66 and 68 with intermediate plates 70, 72, 74 and 76 positioned between the spring plates and angles, and the plates are secured in position by a bolt 78 having a nut 80 thereon. The spring plate 20 is mounted by similar clip angles 82 and 84 on the side rail 24 with the plate secured between intermediate plates 86, 88, 90 and 92 and held in the angles by a bolt 94 with a nut 96 thereon. The tension on the cable is adjusted by the eyes 30 and 32 so that the retaining forces are equalized, and continuous or gradually exaggerating swinging from side to side is reduced to a minimum.

In the design illustrated in Figures 3 to 6, inclusive, the cable of the stabilizing unit is replaced by screw eyes having right and left hand threads and turnbuckles, and the mounting bracket, conventional ball and socket hitch, and spring units are similar to those shown in Figures 1 and 2. In this design a conventional ball 100 is mounted on an upper arm 102 of a bracket 104 and a similar ball 106 is mounted on a lower arm 108 of the bracket. The ball 100 is positioned to receive a socket 110 on side rails 112 and 114, to which the socket is secured by a plate 116, and the ball 106 is positioned to receive a socket 118 that is mounted on plates 120 and 122 by a bolt 124. The plates 120 and 122 are secured together by intermediate bolts 126 having spacing sleeves thereon, and screw eyes 128 and 130 are pivotally mounted between the plates by bolts 132 and 134, respectively, the spacing bolts 132 and 134 also being provided with spacing sleeves 136.

The socket 118 is provided with a locking latch 138 and the latch is actuated by a cam 140 which is positioned in the socket and adjusted by a thumb screw 142.

The screw eyes 128 and 130, which are provided with left hand threads, are threaded into turnbuckles 144 and 146 and similar screw eyes 148 and 150, which are provided with right hand threads, are threaded into the opposite ends of the turnbuckles. The screw eyes 148 and 150 are mounted in lower depending ends of spring plates 152 and 154, respectively, by sockets 156 that are attached to the spring plates by bolts 158 with nuts 160 on the ends thereof, and the sockets 156 are provided with flanges 162 and 164 between which the screw eyes 148 and 150 are secured by bolts 166, the bolts being provided with nuts 168.

The spring plates 152 and 154 are mounted on the outer surfaces of side rails 112 and 114 of a trailer by brackets 170 and 172, respectively, the said brackets being similar to spring plate mounting elements shown in Figures 1 and 2.

With the parts arranged in this manner the tension on the cable or turnbuckle assemblies is adjusted so that ball and socket hitch connections are urged upwardly and the upward thrust causes a downward reaction at the front and thereby on the forward springs of a towing vehicle. With the forward end of a trailer supported, or held upwardly in this manner the use of a dolly, or wheels is not required.

In driving a motor vehicle the operator is continuously turning the steering wheel particularly in driving around curves and in turning corners, and this slight movement from side to side starts side sway in a trailer being towed by the vehicle. This side sway increases with each swing until it influences the travel of the vehicle to such an extent that the operator finds it necessary to slow down and even stop. With the ends of the cable or turnbuckles properly adjusted this pull from side to side is reduced to a minimum, and with continuous driving the parts are brought back to their original positions. By adjusting the positions or numbers of the spring leaves used with the spring plates substantially any resiliency desired, may be provided and with the cable crossed, as shown in full lines in Figure 2, the side sway or swing is readily absorbed. It will be noted that the cable may also be used without being crossed, as indicated by the dotted lines at the sides of the drawing in Figure 2.

It will also be noted that to further compensate for the lateral forces resulting from lateral or side sway and also for vertical bending in the hitch connection, the center of the lower ball or sheave is spaced ahead of the conventional ball and socket on the upper arm of the mounting bracket.

From the foregoing description it is thought to be obvious that a trailer hitch constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

Having thus fully described the invention what I claim as new and desire to secure by Letters Patent, is:

1. A trailer hitch comprising a bracket, U- shaped in elevation having upper and lower arms for mounting the hitch on a towing vehicle, a ball, means mounting the ball on the upper arm of the bracket, a socket positioned over the ball providing a conventional trailer hitch, means for mounting the socket on a trailer, a stabilizing element spaced below said conventional hitch and substantially parallel thereto, the forward end of said stabilizing element being mounted on the lower arm of said bracket at a point spaced ahead of the ball of the upper arm, said stabilizing element having outwardly diverging members extended from said bracket, and resilient elements on the ends of the said outwardly diverging members of the stabilizing element for attaching said members to side rails of a trailer whereby resilient forces are applied laterally in a horizontal plane for retaining said hitch elements in a vertical plane, the connection of the element to the lower arm of the bracket being independent of the ball and socket connection to the upper arm of the bracket.

2. In a trailer hitch, the combination which comprises a trailer having side rails, said rails converging toward the forward end of the trailer, a towing vehicle, a horizontally disposed mounting bracket, U-shape in elevation, having upper and lower arms carried by the towing vehicle, a ball mounted on the upper arm of the bracket, a socket mounted on the forward ends of the side rails of the trailer and positioned over the said ball, a ball mounted on the lower arm of the bracket and spaced ahead of the ball on the said upper arm, a socket positioned over the ball on the lower arm of the bracket, outwardly diverging threaded members having turnbuckles therein extended from the socket of the ball on the lower arm of the bracket, brackets having spring plates extended downwardly therefrom mounted on the side rails of the trailer, and sockets connecting the said outwardly diverging members to the downwardly extended spring plates.

References Cited in the file of this patent

UNITED STATES PATENTS

| Number | Name | Date |
|---|---|---|
| 1,540,463 | Doe | June 2, 1925 |
| 2,453,941 | Smit | Nov. 16, 1948 |
| 2,498,780 | Winchester | Feb. 28, 1950 |
| 2,507,189 | Arehart | May 9, 1950 |
| 2,541,356 | Hansmann | Feb. 13, 1951 |
| 2,549,814 | Hume | Apr. 24, 1951 |

FOREIGN PATENTS

| Number | Country | Date |
|---|---|---|
| 552,916 | Great Britain | Apr. 29, 1943 |